No. 766,111. PATENTED JULY 26, 1904.
R. MOWERY.
ICE CUTTING MACHINE.
APPLICATION FILED OCT. 1, 1903.
NO MODEL. 2 SHEETS—SHEET 1.
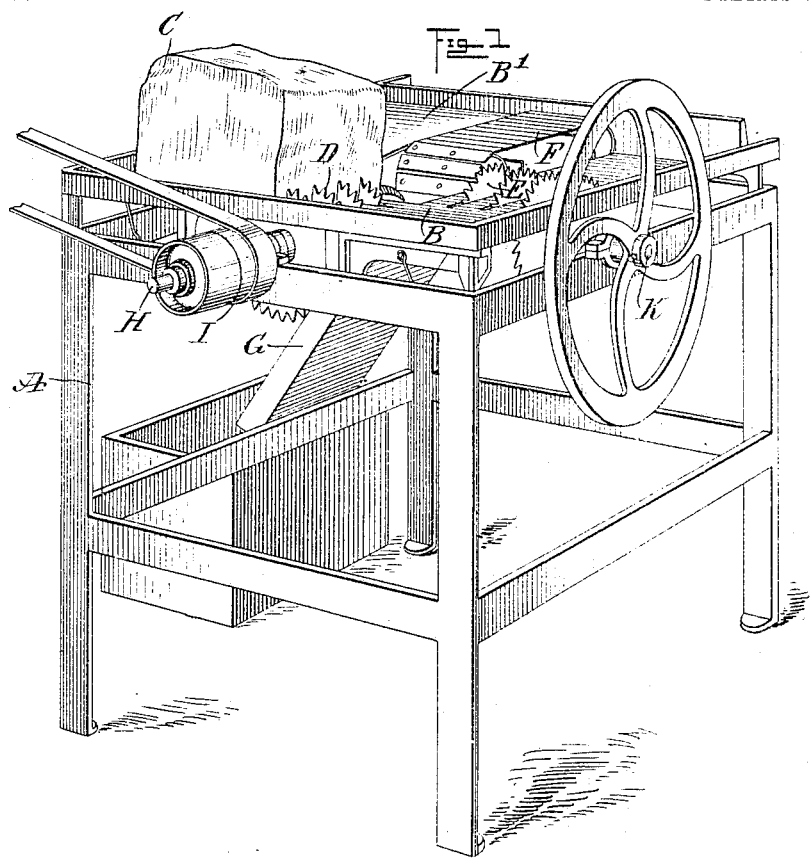
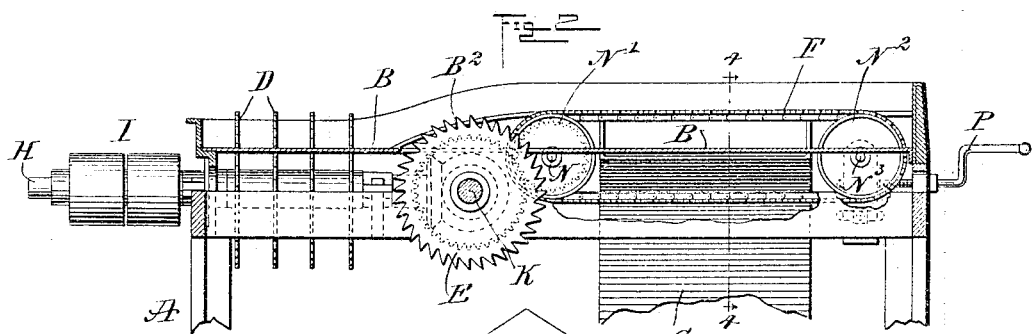
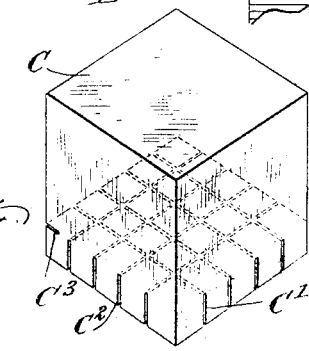
WITNESSES:
INVENTOR
Robert Mowery
BY
ATTORNEYS No. 766,111. PATENTED JULY 26, 1904.
R. MOWERY.
ICE CUTTING MACHINE.
APPLICATION FILED OCT. 1, 1903.
NO MODEL. 2 SHEETS—SHEET 2.
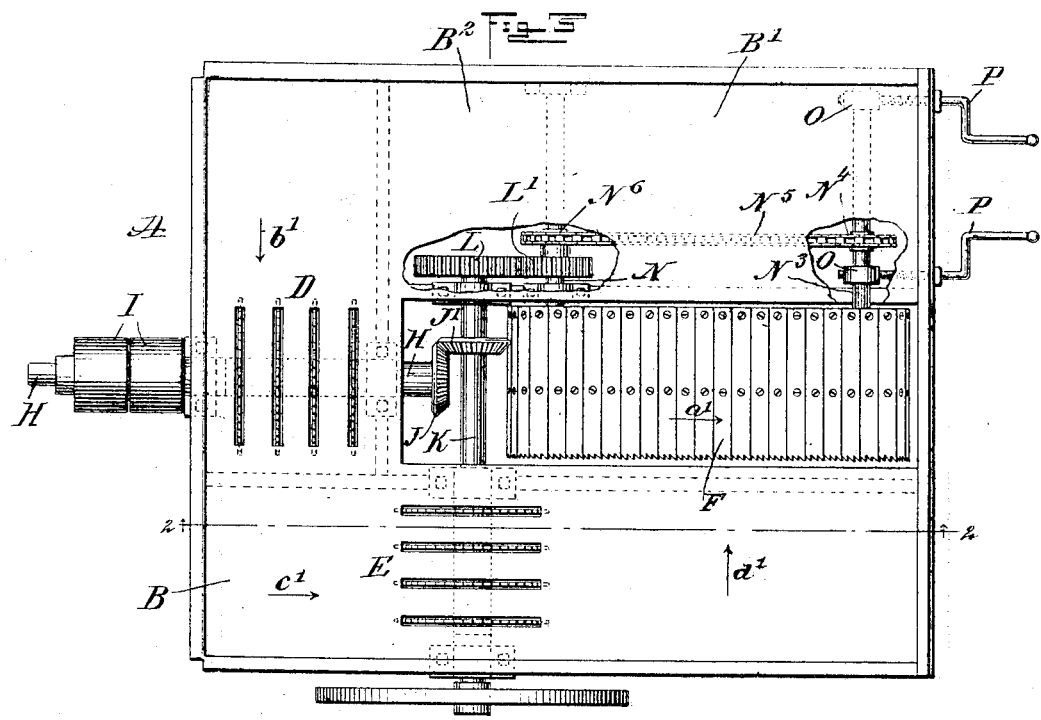
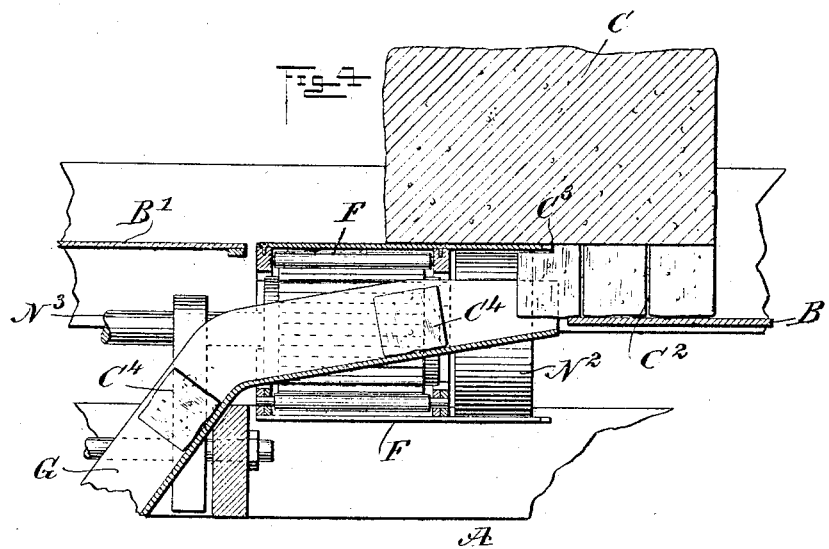
WITNESSES:
INVENTOR
Robert Mowery
BY
ATTORNEYS No. 766,111.  
Patented July 26, 1904.

UNITED STATES PATENT OFFICE.

ROBERT MOWERY, OF HOT SPRINGS, ARKANSAS, ASSIGNOR OF THREE-FOURTHS TO JOHN D. TELLMAN, OF HOT SPRINGS, ARKANSAS.

ICE-CUTTING MACHINE.

SPECIFICATION forming part of Letters Patent No. 766,111, dated July 26, 1904.

Application filed October 1, 1903. Serial No. 175,320. (No model.)

*To all whom it may concern:*

Be it known that I, ROBERT MOWERY, a citizen of the United States, and a resident of Hot Springs, in the county of Garland and State of Arkansas, have invented a new and Improved Ice-Cutting Machine, of which the following is a full, clear, and exact description.

The object of the invention is to provide a new and improved cutting-machine more especially designed for cutting blocks of ice into small pieces for use in hotels and other establishments and arranged to allow convenient and quick handling of the block during the cutting operation.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a sectional side elevation of the same on the line 2 2 of Fig. 3. Fig. 3 is a plan view of the same, parts being broken out. Fig. 4 is an enlarged transverse section of the improvement on the line 4 4 of Fig. 2, and Fig. 5 is a perspective view of a block of ice showing the several cuts.

The cutting-machine is mounted on a suitably-constructed frame A, supporting a feed-table B, over which a block C of ice is moved to successively engage cutting devices D, E, and F, serving to provide the lower portion of the block throughout the length and width thereof with vertically-disposed intersecting cuts $C'$ and $C^2$ and a horizontal cut $C^3$ approximately at the upper ends of the vertical cuts $C'$ and $C^2$ to form small pieces $C^4$, preferably in the form of cubes. (See Fig. 4.)

As shown in the drawings, the cutting devices D and E are in the form of gangs of circular saws, while the cutting device F is in the shape of a horizontally-disposed endless band or link saw. The circular saws of the cutting devices D and E are disposed vertically and project through slots in the feed-table B a distance corresponding to the height and width of a piece $C^4$, and the upper or cutting run of the band-saw extends about the same distance above the feed-table, while the lower run of the said band-saw is a distance below the feed-table, and between the upper and lower runs of the band-saw extends a chute G for carrying the pieces $C^4$ to a box or other receptacle. (See Figs. 1 and 4.)

The circular saws of the cutting device D are secured on an arbor H, extending longitudinally below the feed-table and journaled in suitable bearings attached to the frame A. On the outer end of the arbor H are arranged fast and loose pulleys I, connected by belt with other machinery for imparting a rotary motion to the shaft H and the circular saws of the cutting device D, secured thereon. The inner end of the arbor H is connected by a bevel gear-wheel J with a bevel gear-wheel $J'$, fastened on an arbor K, carrying the circular saws of the cutting device E, the said arbor K extending transversely below the feed-table B. The arbor K is journaled in suitable bearings carried by the frame A, and on the inner or rear end of the said arbor is secured a gear-wheel L, in mesh with a gear-wheel $L'$, fastened on a shaft N, carrying a pulley $N'$, over which passes one end of the band-saw forming the cutting device F, the other end of the said band-saw passing over a similar pulley $N^2$, fastened on a shaft $N^3$, provided with a sprocket-wheel $N^4$, connected by a sprocket-chain $N^5$ with a sprocket-wheel $N^6$ on the shaft N, so that when the latter is rotated a turning motion is given to the pulleys $N'$ and $N^2$ to cause the band-saw to travel in the direction of the arrow $a'$.

By the arrangement described the three cutting devices D, E, and F are driven in unison, and by reference to Fig. 3 it will be seen that the circular saws of the cutting device D stand at right angles to the circular saws of the cutting device E and the endless band-saw of the cutting device F extends longitudinally, so that a block C can be readily moved over the feed-table to successively engage the said cutting devices to provide the same at the under side with the cuts C', C², and C³, above mentioned.

It is understood that the teeth of the band-saw F are at the front edge thereof, as plainly shown in Fig. 3, so that when the block is pushed transversely over the feed-table B after the block has received the cuts C' and C² then the upper run of the said band-saw cuts the block horizontally to form the pieces C⁴ and separate the same from the block, the latter sliding over the top of the upper run onto a table B' on a level with the upper run of the band-saw and having its left side formed with a downwardly-curved extension B², leading to the starting-point of the feed-table B in the rear of the cutting device D.

In order to insure a proper running of the endless band-saw, the shaft N³, above mentioned, is journaled in bearings O, held longitudinally adjustable by screw-rods P, turning in the main frame A, so as to hold the band-saw stretched to insure proper cutting.

The operation is as follows: When the arbor H is driven, the cutting devices D, E, and F are simultaneously set in motion, and the block of ice C, placed at the starting-point of the feed-table, is now pushed transversely in the direction of the arrow b' to bring the block in engagement with the circular saws of the cutting device D for the latter to provide the lower portion of the block with the transverse cuts C'. When this has been done, the block is moved longitudinally from the left to the right in the direction of the arrow c' to bring the block in engagement with the circular saws of the cutting device E, so that the said circular saws provide the lower portion with the longitudinal cuts C², intersecting the cuts C' at right angles, but being preferably of the same depth. The block having the intersecting cuts C' and C² now stands in front of the band-saw of the cutting device F, and the block is now pushed transversely in the direction of the arrow d' for the teeth of the upper run of the band-saw to provide the block with the cut C³ at the upper ends of the cuts C' and C² to form the pieces C⁴, as previously mentioned. The pieces C⁴ as cut off drop into the upper end of the chute G, which delivers the pieces to a box or other receptacle.

The block traveling transversely over the top of the upper run of the band-saw finally moves onto the table B', from which the block is pushed longitudinally, but from the right to the left, down over the extension B² to again reach the starting-point of the feed-table B in the rear of the cutting device D.

The above-described operation is now repeated to again cut pieces C⁴ from the lower portion of the block, and the operation is repeated until the entire block is cut into pieces, as described.

From the foregoing it will be seen that the cutting devices are so grouped relative one to the other that the block is moved around in a cycle for cutting the block by successive operations into small pieces or cubes.

Having thus described my invention, I claim as new and desire to secure by Letters Patent—

1. A cutting device for blocks of ice or other material provided with gangs of circular saws, a stationary feed-table for supporting a block as it is fed forward to the gangs of circular saws, said saws being disposed at angles one to the other and extending upwardly through said stationary table at right angles to the top thereof to provide the under face of a block with intersecting cuts, a horizontally-disposed band-saw having its cutting-run above the top of the table upon which the ice is supported for cutting the blocks at right angles to the intersecting cuts, and a stationary elevated return-table beyond the band-saw the face of which table is on a level with the cutting-run of the band-saw.

2. A cutting device for blocks of ice or other material, said device being provided with sets of circular saws, a feed-table for supporting a block as it is fed forward to the gangs of circular saws, said sets of saws being disposed at angles one to the other to provide one face of a block with intersecting cuts of equal depth, a horizontally-disposed band-saw for cutting the block at right angles to the intersecting cuts and approximately at the inner ends thereof, said saws being all geared together, and an elevated return-table at the rear of the band-saw, upon which the remainder of the block of ice is received after the band-saw has operated thereupon.

3. A cutting device for blocks of ice or other material, provided with gangs of circular saws, a feed-table for supporting a block as it is fed forward to the gangs of circular saws, said saws being disposed at angles one to the other and all extending upwardly through said table an equal distance above the top thereof to provide the under face of a block with intersecting cuts of equal depth, a horizontally-disposed band-saw working in a plane even with the tops of the circular saws for cutting the block at right angles to the intersecting cuts and approximately at the inner ends thereof, an elevated return-table, the face of which is on a level with the cutting-run of the band-saw, and an incline leading down from said elevated table to the level of said feed-table.

4. A cutting device for blocks of ice or other material, provided with gangs of circular saws, a feed-table for supporting a block as it is fed forward to the gangs of saws, said saws being disposed at angles one to the other and extending upwardly through said table above the top thereof, to provide the under face of a block with intersecting cuts, a horizontally-disposed band-saw working in a plane even with the tops of the circular saws for cutting the block at right angles to the intersecting cuts, and an elevated return-table the face of which is on a level with the cutting-run of the band-saw, the rear edge or back of the cutting-section of the band-saw being close to the edge of said elevated table and forming as it were an extension thereof, said main table having a delivery-opening underneath said band-saw.

5. A cutting device for blocks of ice or other material, provided with gangs of circular saws, a feed-table for supporting a block as it is fed forward to the gangs of saws, said saws being disposed at angles one to the other and extending upwardly through said table above the top thereof to provide the under face of a block with intersecting cuts, said table having an opening, a horizontally-disposed band-saw, located in said opening in the table with its cutting-section working in a plane above the top of said table, for cutting the blocks at right angles to the intersecting cuts, an elevated return-table the face of which is on a level with the cutting-run of the band-saw, the saw forming as it were an extension of said elevated table, and a delivery-chute extending between the two sides of the band-saw to the side of the opening in the table underneath the teeth of said band-saw to receive the small blocks of ice as they are cut from the large block.

6. A cutting device for blocks of ice or other material provided with gangs of circular saws, a feed-table for supporting a block as it is fed forward to the gangs of saws, said table having openings, and said saws being disposed at angles one to the other and extending upwardly through said openings above the top of the table, whereby intersecting cuts may be made on the under side of a block of ice, a horizontally-disposed band-saw having its cutting-run working in a plane above the top of said table for cutting the blocks at right angles to the intersecting cuts, a delivery-chute extending between the sides of the band-saw, and an elevated return-table at the rear of the band-saw and in the same plane with the cutting-run thereof and having its front edge in alinement with the rear edge of said cutting-run to support the saw against horizontal strain.

7. A cutting device for blocks of ice or other material, said device being provided with gangs of circular saws extending upwardly through the table above the top thereof a distance equal to the thickness of the blocks to be cut, a feed-table for supporting a block as it is fed forward to the gangs of circular saws, said saws being disposed at angles one to the other, whereby intersecting cuts may be made on the under side of a block of ice, a horizontally-disposed band-saw having its cutting-run located in the same plane with the tops of the circular saws for cutting the block at right angles to the intersecting cuts and an elevated return-table coöperating with the cutting-run of the band-saw, at the rear thereof.

8. In a device of the character described, the combination of a table, gangs of circular saws extending upwardly through said table, and a horizontally-disposed band-saw, having its cutting-run above the top of the table and coöperating with the circular saws, said table having the portion of its top at the rear of the band-saw, elevated to a level with the cutting-run of said saw, with an incline at one end of said elevated portion, leading down to a level with the main portion of the table, and the vertical space between the levels of said tables being left open.

In testimony whereof I have signed my name to this specification in the presence of two subscribing witnesses.

ROBERT MOWERY.

Witnesses:
J. W. COVINGTON,
S. B. NOLLEY.